(12) United States Patent
Matsumoto et al.

(10) Patent No.: US 7,724,755 B2
(45) Date of Patent: May 25, 2010

(54) COMMUNICATIONS APPARATUS

(75) Inventors: Yuji Matsumoto, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 11/598,023

(22) Filed: Nov. 13, 2006

(65) Prior Publication Data

US 2008/0002644 A1 Jan. 3, 2008

(30) Foreign Application Priority Data

Jun. 29, 2006 (JP) .............................. 2006-179851

(51) Int. Cl.
*H04L 12/56* (2006.01)

(52) U.S. Cl. ................. 370/412; 370/235.1; 370/338; 370/235; 370/218; 370/232; 370/401; 370/400

(58) Field of Classification Search ................. 370/338, 370/331, 401, 235.1, 235, 232, 218, 412, 370/400
See application file for complete search history.

(56) References Cited

U.S. PATENT DOCUMENTS

| | | | |
|---|---|---|---|
| 6,208,653 B1 * | 3/2001 | Ogawa et al. | 370/395.52 |
| 6,215,769 B1 | 4/2001 | Ghani et al. | |
| 6,542,512 B1 * | 4/2003 | Fischer et al. | 370/412 |
| 6,788,697 B1 * | 9/2004 | Aweya et al. | 370/412 |
| 7,072,294 B2 * | 7/2006 | Kasper et al. | 370/229 |
| 7,177,276 B1 * | 2/2007 | Epps et al. | 370/230 |
| 7,180,857 B2 * | 2/2007 | Kawakami et al. | 370/231 |
| 7,333,451 B1 * | 2/2008 | Khalil et al. | 370/331 |
| 7,599,296 B2 * | 10/2009 | Tartarelli et al. | 370/235.1 |
| 2003/0031203 A1 | 2/2003 | Fukui | |
| 2004/0215753 A1 | 10/2004 | Chan et al. | |

FOREIGN PATENT DOCUMENTS

| | | |
|---|---|---|
| JP | 11-177536 | 7/1999 |
| WO | WO 99/04536 | 1/1999 |
| WO | WO 02/056631 | 7/2002 |

OTHER PUBLICATIONS

Extended European Search Report; Application No. 06123640.2-2413; Reference No. P107349EP00/PMH; date Dec. 19, 2007; 8 pages.

* cited by examiner

*Primary Examiner*—Charles N Appiah
*Assistant Examiner*—Kwasi Karikari
(74) *Attorney, Agent, or Firm*—Hanify & King, PC

(57) ABSTRACT

To provide a communications apparatus for preventing degradation in data quality, which is caused by the missing of reception data at the time of a data communication, an application processing unit comprises a load monitor processing unit for monitoring a load imposed at the time of a reception data process, and a reception response processing unit for issuing a reception response instruction to a protocol processing unit, and the protocol processing unit comprises a first data notifying unit for transmitting a reception response to reception data, and a second data notifying unit for transmitting a reception response according to an instruction from the reception response processing unit.

12 Claims, 13 Drawing Sheets

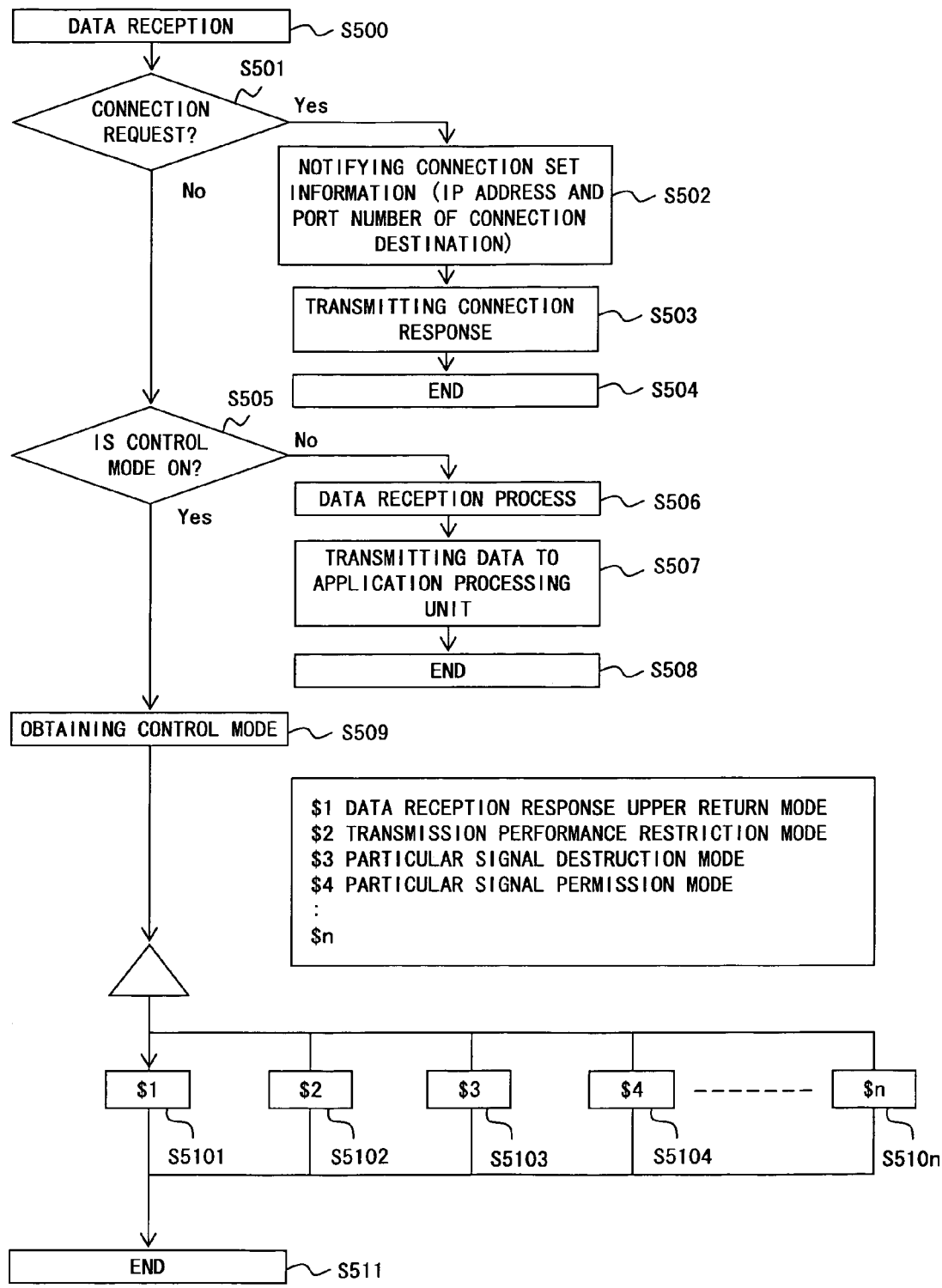
F I G. 7

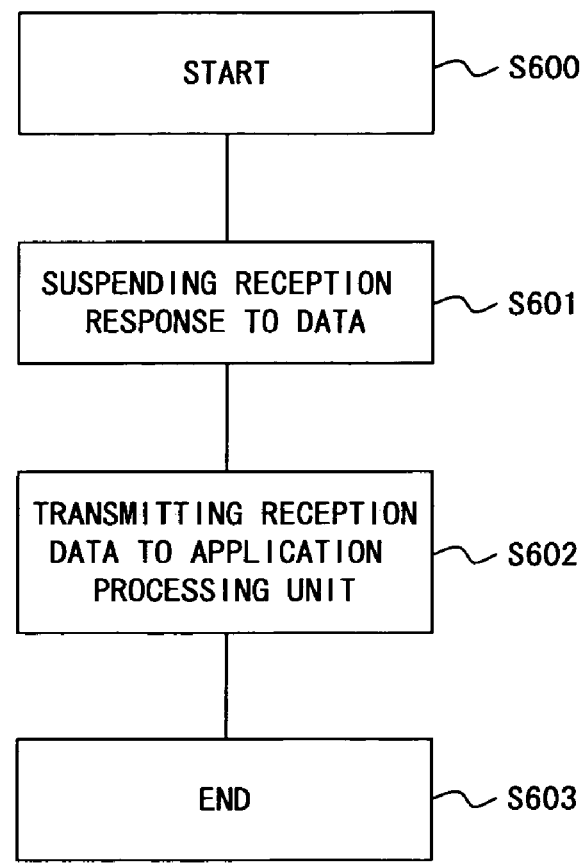
F I G. 8

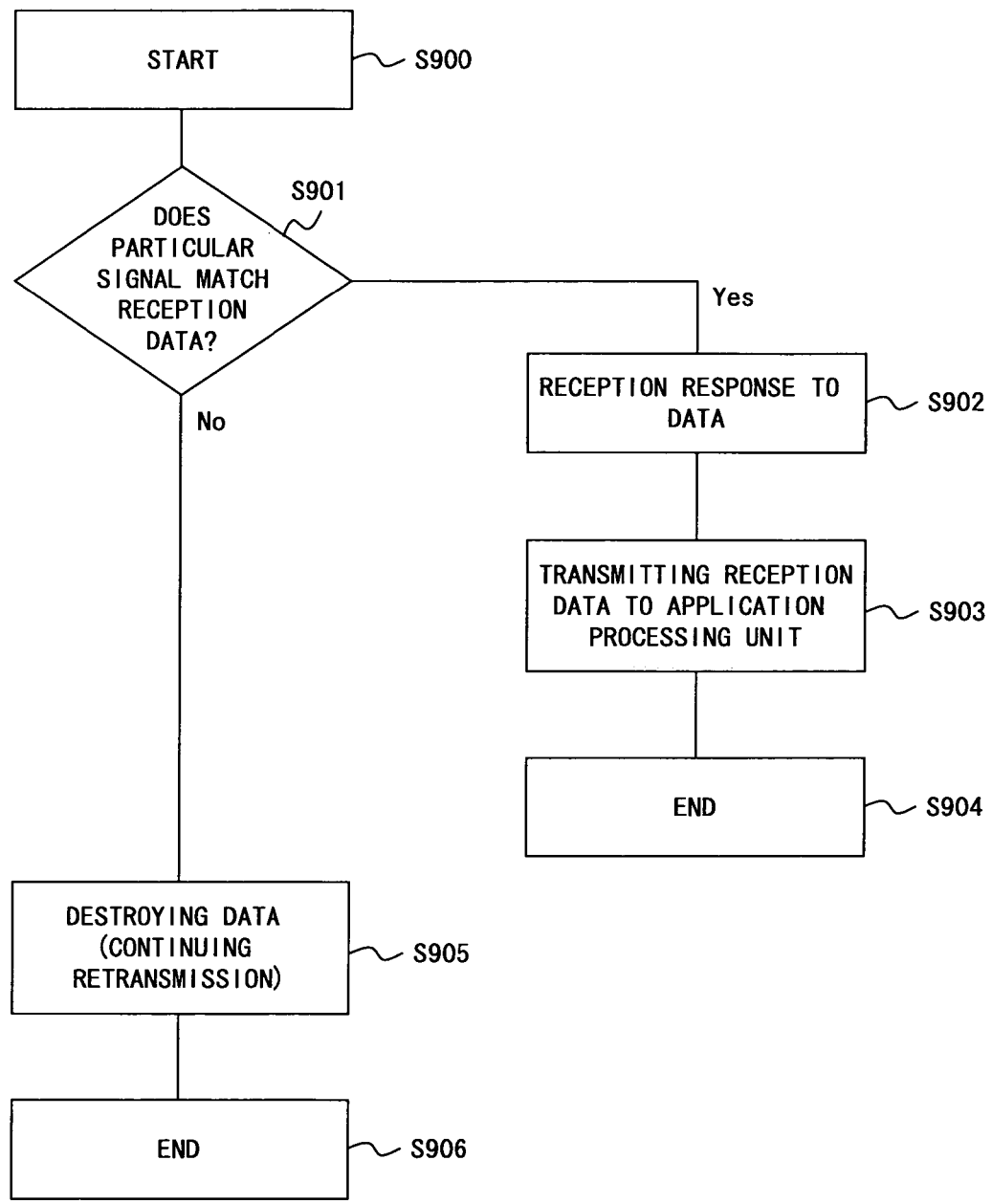
F I G. 1 1

COMMUNICATIONS APPARATUS

BACKGROUND OF THE INVENTION

1. Field of the Invention

The present invention relates to a data communications apparatus for controlling a retransmission.

2. Description of the Related Art

Normally, high reliability to assure that data surely reaches a transmission destination is required when a data communication is made. For example, in a data communication made on the Internet, TCP (Transmission Control Protocol) is used as a standard protocol. This is because TCP is a protocol having a retransmission capability.

For instance, in a data communication using TCP, a transmitting side sets a retransmission timer each time it transmits transmission data (transmission segment). Upon detection of a timeout, the transmitting side retransmits the same transmission data. In the meantime, a receiving side checks a sequence number attached to the header of the transmission data, and issues a request to retransmit the transmission data that does not reach.

FIG. 1 is a block diagram exemplifying a configuration of a conventional data communications system.

An opposed communications apparatus 1201 shown in FIG. 1 is configured with an application processing unit 1201*a* for making a data communication, a protocol processing unit 1201*b* for enabling a communication between arbitrary computers and for assuring transmission data, and an interface 1201*c* for converting an electric signal on a network into digital data and for enabling a data transmission between the computers.

For example, the application processing unit 1201*a* is equivalent to an application layer of TCP/IP (Internet Protocol), and the protocol processing unit 1201*b* is equivalent to TCP and IP layers of TCP/IP. The interface 1201*c* is equivalent to a network interface layer of TCP/IP.

Also a communications apparatus 1202 is configured with an application processing unit 1202*a*, a protocol processing unit 1202*b*, and an interface 1202*c*. The opposed communications apparatus 1201 and the communications apparatus 1202 are interconnected via a communications network 1203 to make a communication. The communications network 1203 may be directly connected, or may be connected by a network via a plurality of apparatuses.

FIG. 2 is a schematic showing the outline of a communication process performed in the conventional data communications system. A case where the opposed communications apparatus 1201 and the communications apparatus 1202 make a data communication is described below in correspondence with (1) through (14) shown in FIG. 2.

(1) When the opposed communications apparatus 1201 starts a communication, the application processing unit 1201*a* transmits transmission data to the protocol processing unit 1201*b*.

(2) The protocol processing unit 1201*b*, which receives the transmission data, transmits a connection request to the communications apparatus 1202, being a transmission destination, in order to establish a connection. At this time, the connection request is transmitted to the communications apparatus 1202 via the interface 1201*c* and the communications network 1203, although this is not shown in FIG. 2.

(3) When the communications apparatus 1202 accepts the connection request signal, the protocol processing unit 1202*b* transmits a connection response to the opposed communications apparatus 1201, being the transmitter, and establishes a connection.

(4) When the connection is established, the protocol processing unit 1201*b* partitions the data received from the application processing unit 1201*a* into a predetermined size, and starts to sequentially transmit the partitioned data to the communications apparatus 1202.

(5) In the meantime, in the communications apparatus 1202, the protocol processing unit 1202*b* transmits a data reception response to the opposed communications apparatus 1201 each time the data is received.

(6) When the reception of the communication data is complete, the protocol processing unit 1202*b* restores the transmission data partitioned in (4), and transmits the restored data to the application processing unit 1202*a*.

The above described process is repeated, whereby the transmission process of the data from the opposed communications apparatus 1201 to the communications apparatus 1202 is performed. Also a case where the communications apparatus 1202 makes a data transmission to the opposed communications apparatus 1201 is similar.

Here, a case where the opposed communications apparatus 1201 transmits data $\alpha$ and $\beta$ to the communications apparatus 1202 is considered.

(7) The protocol processing unit 1201*b*, which accepts the data $\alpha$ from the application processing unit 1201*a*, transmits the data $\alpha$ to the communications apparatus 1202.

(8) The protocol processing unit 1202*b*, which receives the data $\alpha$, transmits a reception response to the data $\alpha$ to the opposed communications apparatus 1201 which is a transmitter.

(9) Furthermore, the protocol processing unit 1202*b* transmits the received data $\alpha$ to the application processing unit 1202*a*.

(10) Similarly, the protocol processing unit 1201*b*, which accepts the data $\beta$ from the application processing unit 1201*a*, transmits the data $\beta$ to the communications apparatus 1202.

(11) For example, if collision of data occurs on the communications network 1203, the data $\beta$ transmitted from the opposed communications apparatus 1201 disappears and is not transmitted to the communications apparatus 1202.

(12) In the meantime, the protocol processing unit 1201*b* transmits the data $\beta$, and activates a retransmission timer to monitor the reception response to the data $\beta$. Upon detection of a timeout, the protocol processing unit 1201*b* retransmits the data $\beta$.

(13) The protocol processing unit 1202*b*, which receives the data $\beta$, transmits the reception response to the data $\beta$ to the opposed communication apparatus 1201 which is the transmitter.

(14) Furthermore, the protocol processing unit 1202*b* transmits the received data $\beta$ to the application processing unit 1202*a*.

At this time, for example, if memory for storing the data $\beta$ cannot be secured for a reason that the throughput of the application processing unit 1202*a* is inferior to that of the protocol processing unit 1202*b*, the data $\beta$ is destroyed and the application processing unit 1202*a* cannot receive the data $\beta$.

Namely, the application processing unit 1202*a* has completed the reception of only the data $\alpha$ although the application processing unit 1201*a* has completed the transmission of the data $\alpha$ and $\beta$ to the communications apparatus 1202.

Accordingly, the conventional retransmission process shown in (10) through (12) cannot cope with the case where transmission data disappears between the protocol processing unit and the application processing unit as shown in (12) through (14), leading to a problem that the reliability of the data is degraded.

Japanese Published Unexamined Patent Application No. H11-177536 discloses a wireless data link layer error control method for preventing a throughput characteristic from degrading due to the number of unnecessary retransmissions, which grows with an increase in transmission errors caused by degradation in a line state, by monitoring the line state and suspending a retransmission control when the line state degrades below a reference value, and by restarting the retransmission control when a monitoring result restores to a more favorable value than the reference value.

Additionally, WO Patent Publication No. 2002/056631 discloses a mobile communications system, which can reduce a delay time required for a retransmission between two processing units of a layer by suppressing the missing of data and a retransmission request frame for a retransmission request between the two processing units of the layer in a base station and a mobile station, and can prevent a throughput from degrading by suppressing an occurrence of a timeout in an upper TCP.

SUMMARY OF THE INVENTION

The present invention was developed in consideration of the above described problem, and an object thereof is to provide a communications apparatus for preventing degradation in data quality, which is caused by the missing of reception data at the time of a data communication.

To overcome the above described problem, a communications apparatus according to the present invention is, in a state where a communication can be made with an opposed communications apparatus, a communications apparatus comprising an application processing unit for making a data communication with the opposed communications apparatus, and a protocol processing unit for transmitting/receiving data according to an instruction from the application processing unit and for assuring transmission data by retransmitting the data to the opposed communications apparatus if a reception response to the data transmitted to the opposed communications apparatus is not received during a predetermined duration. The protocol processing unit comprises a first data notifying unit for transmitting a reception response to data upon receipt of the data from the opposed communications apparatus and for passing the data to the application processing unit, and a second data notifying unit for passing data to the application processing unit upon receipt of the data from the opposed communications apparatus and for transmitting a reception response to the data according to an instruction from the application processing unit. The application processing unit comprises a load monitor processing unit for monitoring a load of a transmission/reception process based on the data passed from the first data notifying unit and for switching from the first data notifying unit to the second data notifying unit if the load exceeds a predetermined load, and a reception response processing unit for issuing to the second data notifying unit an instruction to transmit a reception response to the passed data when the data is passed from the second data notifying unit.

According to the present invention, the load monitor processing unit monitors the load of the transmission/reception process, and switches from the first data notifying unit to the second data notifying unit if the load exceeds a predetermined load.

Then, the reception response processing unit (application processing unit) issues to the second data notifying unit (protocol processing unit) the instruction to transmit a reception response, and the second data notifying unit, which receives the instruction, transmits a reception response.

Accordingly, if the application processing unit cannot receive data, by way of example, for a reason that the data transmitted from the protocol processing unit to the application processing unit is destroyed, the protocol processing unit does not transmit a reception response. Therefore, the transmitting side detects a timeout and retransmits the destroyed data, whereby degradation in data quality, which is caused by the missing of reception data, can be prevented.

Additionally, the communications apparatus according to the present invention may be a communications apparatus comprising an application processing unit for making a data communication with an opposed communications apparatus connected to be communicable, and a protocol processing unit for transmitting/receiving data according to an instruction from the application processing unit and for assuring transmission data by retransmitting the data to the opposed communications apparatus if a reception response to the data transmitted to the opposed communications apparatus is not received during a predetermined duration, wherein the protocol processing unit comprises a first data notifying unit for transmitting a reception response to data upon receipt of the data from the opposed communications apparatus and for passing the data to the application processing unit, and a second data notifying unit for destroying the data under a predetermined rule upon receipt of the data from the opposed communications apparatus, and the application processing unit comprises a load monitor processing unit for monitoring a load of a transmission/reception process based on the data passed from the first data notifying unit and for switching from the first data notifying unit to the second data notifying unit if the load exceeds a predetermined load.

Also in this case, the load monitor processing unit monitors the load of the transmission/reception process, and switches from the first data notifying unit to the second data notifying unit if the load exceeds a predetermined load. Then, the second data notifying unit destroys the reception data under a predetermined rule. When the reception data is destroyed, the communications apparatus on the transmitting side detects a timeout, and retransmits the destroyed data.

In this way, the load of the transmission/reception process in the application processing unit is suppressed, and the missing of data transmitted from the protocol processing unit to the application processing unit can be prevented. Accordingly, degradation in data quality, which is caused by the missing of reception data, can be prevented.

As described above, according to the present invention, a communications apparatus for preventing degradation in data quality, which is caused by the missing of reception data at the time of a data communication, can be provided.

BRIEF DESCRIPTION OF THE DRAWINGS

FIG. 7 is a flowchart showing a process performed by a protocol processing unit in the communications apparatus according to the preferred embodiment of the present invention;

FIG. 8 is a flowchart showing a process performed by the protocol processing unit in data reception response upper return mode according to the preferred embodiment of the present invention;

FIG. 11 is a flowchart showing a process performed by the protocol processing unit in particular signal permission mode according to the preferred embodiment of the present invention;

DESCRIPTION OF THE PREFERRED EMBODIMENTS

Preferred embodiments according to the present invention are hereinafter described with reference to FIGS. 3 through 11.

Figure 3:
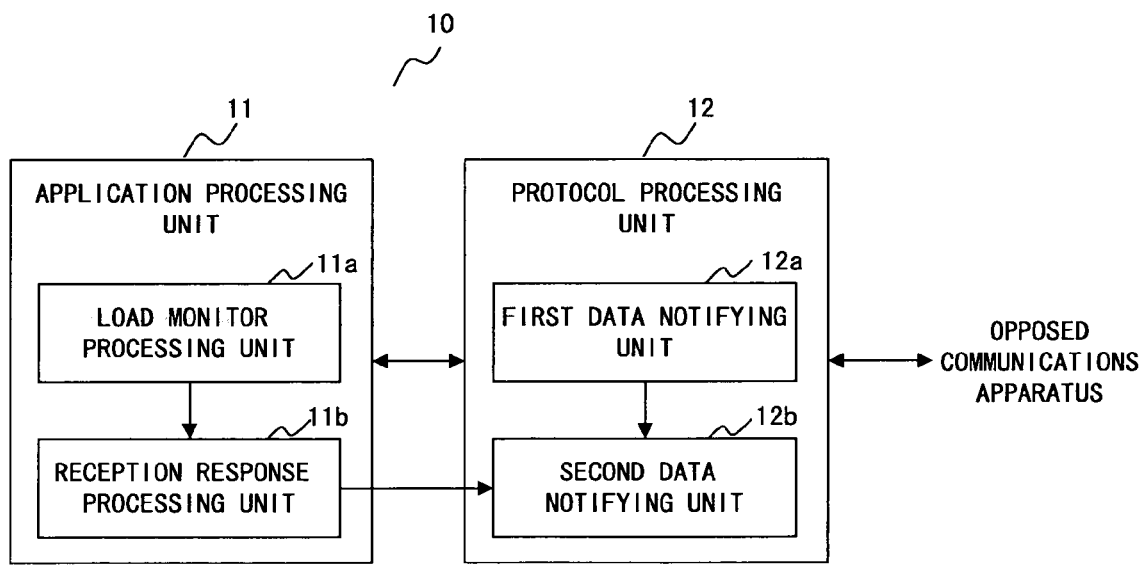
FIG. 3 is a block diagram explaining the outline of a communications apparatus according to a preferred embodiment of the present invention.

FIG. 3 is a block diagram explaining the outline of a communications apparatus 10 according to a preferred embodiment of the present invention.

The communications apparatus 10 shown in FIG. 3 is a communications apparatus at least comprising an application processing unit 11 for making a data communication, and a protocol processing unit 12 for performing a data process under a predetermined protocol.

The application processing unit 11 provides a data communications service such as an HTTP (HyperText Transfer Protocol) communication, an FTP (File Transfer Protocol) communication, or the like.

The application processing unit 11 according to this preferred embodiment comprises a load monitor processing unit 11a for monitoring a load imposed at the time of a reception data process, and a reception response processing unit 11b for issuing a reception response instruction to the protocol processing unit 12.

The load monitor processing unit 11a continually monitors the load imposed to process data received from the protocol processing unit 12. If the load exceeds a predetermined value, the load monitor processing unit 11a issues to the protocol processing unit 12 an instruction to switch from the first data notifying unit 12a to the second data notifying unit 12b.

The reception response processing unit 11b issues to the second data notifying unit 12b an instruction to transmit a reception response to the reception data.

The protocol processing unit 12 performs a protocol process, for example, under TCP/IP.

The protocol processing unit 12 according to this preferred embodiment comprises the first data notifying unit 12a for transmitting a reception response upon receipt of data from an opposed communications apparatus and for transmitting the received data to the application processing unit 11, and the second data notifying unit 12b for transmitting received data to the application processing unit 11 upon receipt of the data from the opposed communications apparatus and for transmitting a reception response according to an instruction from the reception response processing unit 11b.

For example, when the communications apparatus 10 receives data from the opposed communications apparatus, the first data notifying unit 12a transmits a reception response to the opposed communications apparatus, and also transmits the received data to the application processing unit 11.

Upon receipt of the data from the protocol processing unit 12, the load monitor processing unit 11a monitors whether or not a load imposed at the time of a data reception process in the application processing unit 22a exceeds a predetermined value. If the load exceeds the predetermined value, switching is made from the first data notifying unit 12a to the second data notifying unit 12b in the protocol processing unit 12, and the operations of the reception response processing unit 11b are started. Namely, a control mode is turned on.

When the communications apparatus 10 receives data from the opposed communications apparatus, the second data notifying unit 12b transmits the reception data to the application processing unit 11. Upon receipt of the data from the protocol processing unit 12, the reception response processing unit 11b issues a reception response instruction to the second data notifying unit 12b. Then, the second data notifying unit 12b, which receives the reception response instruction, transmits a reception response to the opposed communications apparatus.

Figure 4:
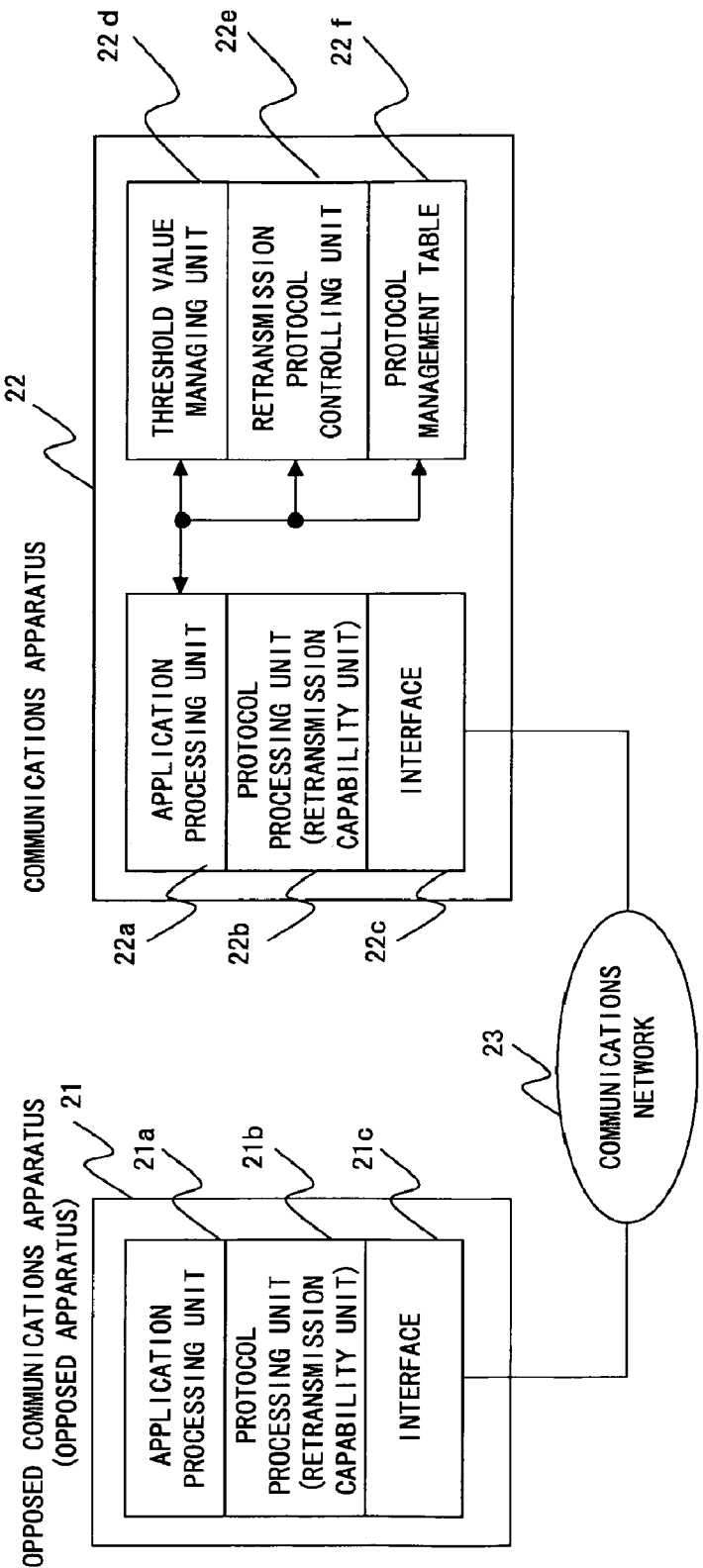
FIG. 4 is a block diagram exemplifying a configuration of a data communications system according to the preferred embodiment of the present invention.

FIG. 4 is a block diagram exemplifying a configuration of a data communications system according to the preferred embodiment of the present invention.

In the data communications system shown in FIG. 4, a normal opposed communications apparatus 21 using a protocol (such as TCP, etc.) having a retransmission capability, and the communications apparatus 22 according to this preferred embodiment are interconnected via a communications network 23.

The opposed communications apparatus 21 is a normal communications apparatus comprising an application processing unit 21a for making a data communication, a protocol processing unit 21b for enabling a communication between arbitrary computers and for assuring transmission data, and an interface 21c for converting an electric signal on the network into electronic data and for enabling a data transmission between the computers.

Figure 1:
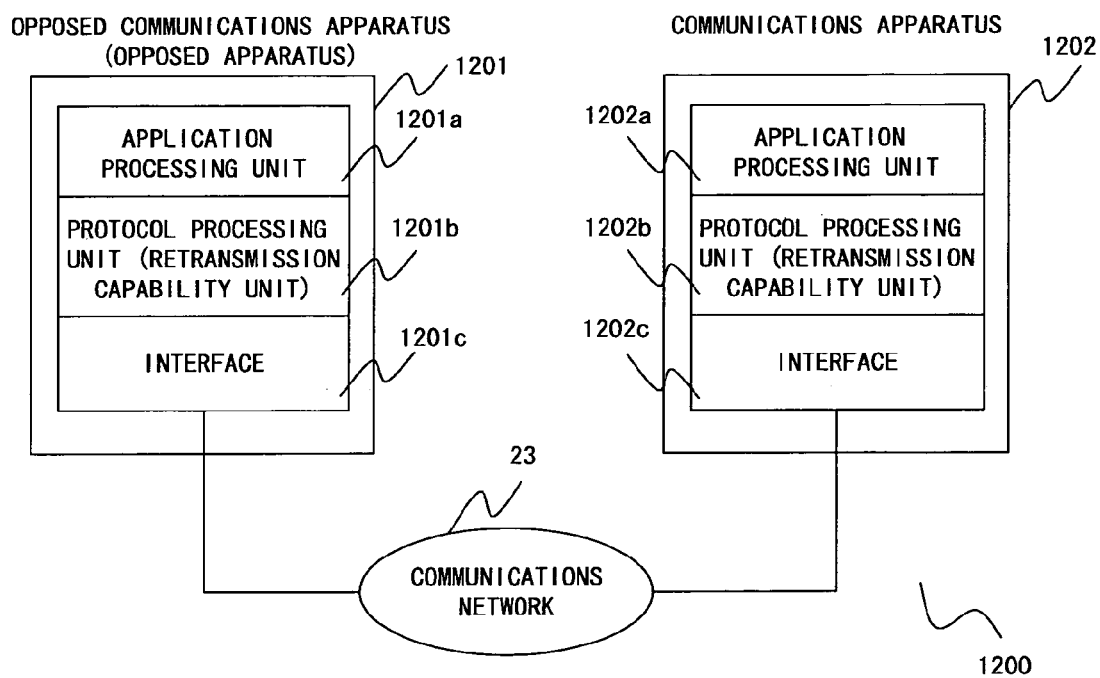
FIG. 1 is a block diagram exemplifying a configuration of a conventional data communications system.
Figure 2:
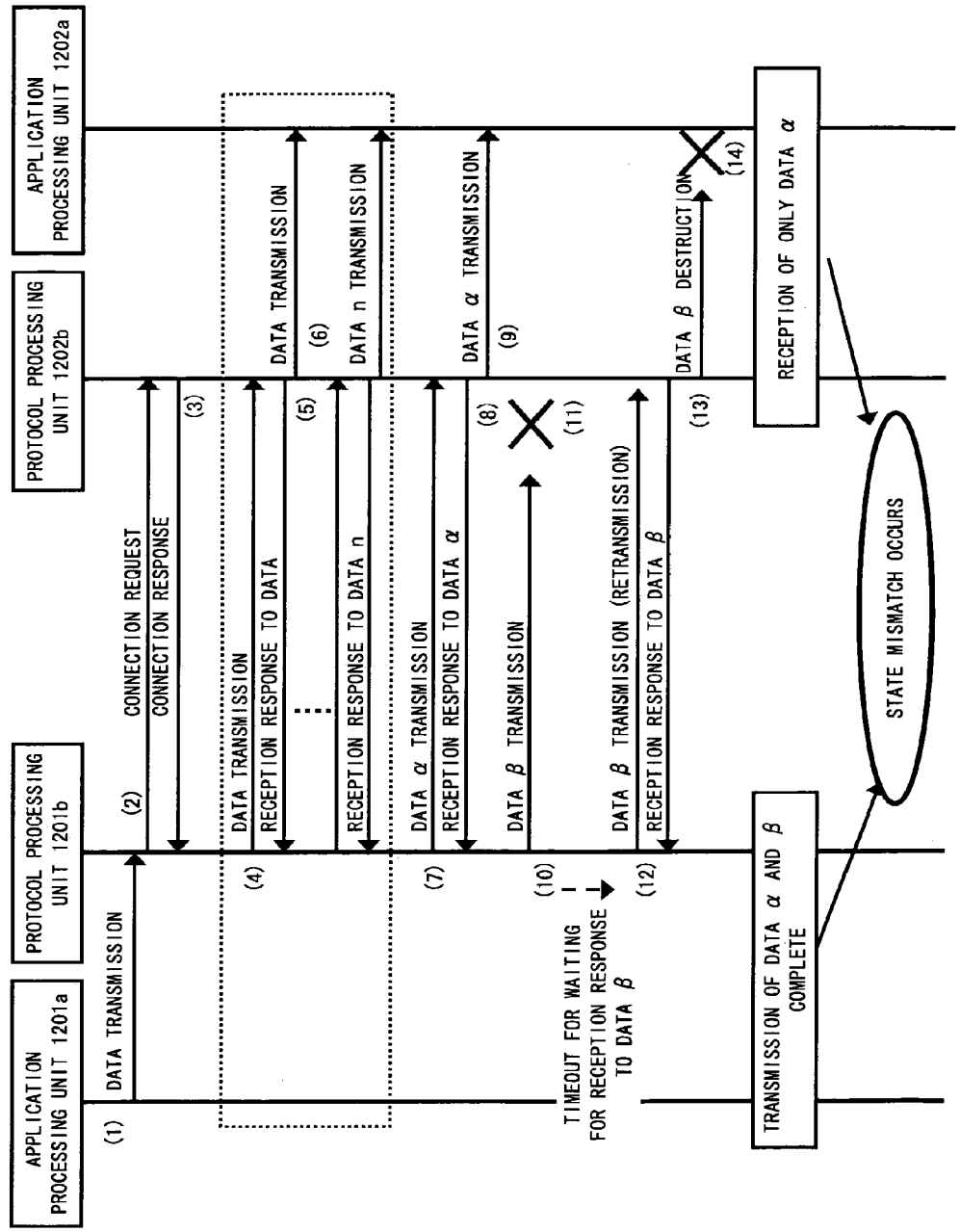
FIG. 2 is a schematic showing the outline of a communication process performed in the conventional data communications system.

Similar to the opposed communications apparatus 1201 shown in FIG. 1, for example, the application processing unit 21a is equivalent to an application layer of TCP/IP, and the protocol processing unit 21b is equivalent to TCP and IP layers of TCP/IP. Additionally, the interface 21c is equivalent to a network interface layer of TCP/IP.

Also the communications apparatus 22 comprises an application processing unit 22a for making a data communication, a protocol processing unit 22b for enabling a communication between arbitrary computers and for assuring transmission data, and an interface 22c for converting an electric signal on the network into electronic data and for enabling a data transmission between the computers, similar to the opposed communications apparatus 21.

The application processing unit 22a comprises a threshold value managing unit 22d, a retransmission protocol controlling unit 22e and a protocol management table 22f in addition to the above described capabilities.

The threshold value managing unit 22d monitors a load by measuring the load imposed at the time of a data communication in the application processing unit 22a. If the measured load exceeds a predetermined threshold value as a result of a comparison made between the measured load and the threshold value, the threshold value managing unit 22d determines that a control for a retransmission protocol is required because the load becomes heavy. In this preferred embodiment, a message amount (data size) received per unit time is used as the "load imposed at the time of a data communication". However, the load is not limited to the message amount. Information expected to represent the "load imposed at the time of a data communication" may be used on demand.

The retransmission protocol controlling unit 22e controls the retransmission capability of the protocol processing unit 22b.

The protocol management table 22f is a management table used to manage a communications apparatus, for which a retransmission process is to be performed. In this preferred embodiment, the IP address and the port number of the communications apparatus, which is making a communication, are stored in the protocol management table 22f.

For ease of explanation, FIG. 4 shows the case where the normal opposed communications apparatus 21 is used on the transmitting side, and the communications apparatus 22 according to this preferred embodiment is used on the receiving side. However, communications apparatuses 22 may be used as both of the apparatuses on the transmitting and the receiving sides as a matter of course.

Figure 5:
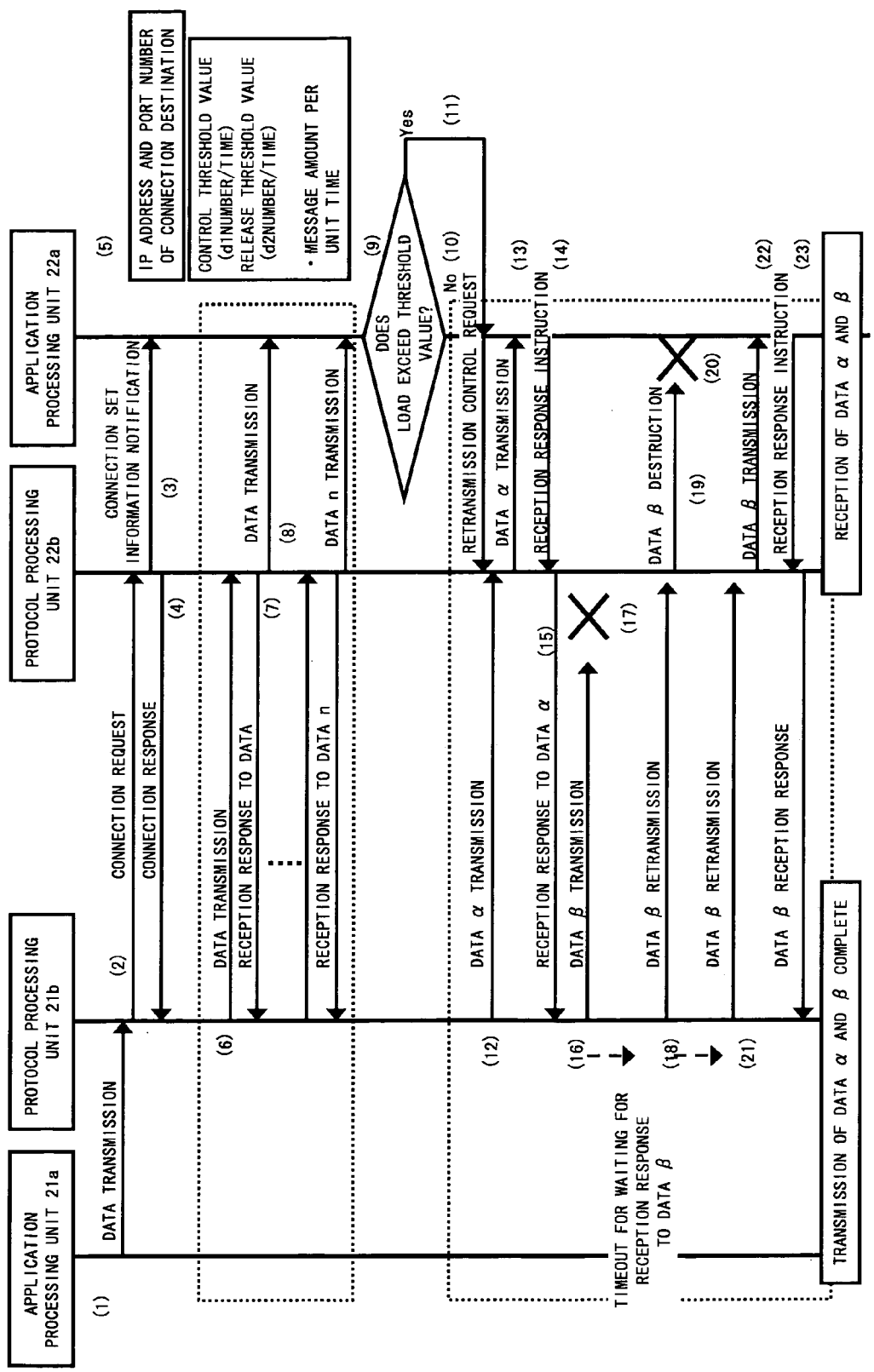
FIG. 5 is a schematic showing the outline of a communication process performed in the data communications system according to the preferred embodiment of the present invention.

FIG. 5 is a schematic showing the outline of a communication process performed in the data communications system according to the preferred embodiment of the present invention. A case where the opposed communications apparatus 21 and the communications apparatus 22 make a data communication is described below in correspondence with (1) through (23) shown in FIG. 5.

Note that the description is provided by assuming that the transmission/reception of data between the application processing unit 22a and the protocol processing unit 22b in this preferred embodiment is made with a data communication. However, the data may be merely passed/received.

(1) When the opposed communications apparatus 21 starts a communication, the application processing unit 21a transmits transmission data to the protocol processing unit 21b.

(2) The protocol processing unit 21b, which receives the transmission data, transmits a connection request signal to the communications apparatus 22 which is a transmission destination in order to establish a connection. At this time, the connection request signal is transmitted to the communications apparatus 22 via the interface 21c and the communications network 23, although both are not shown.

(3) Upon acceptance of the connection request signal, the protocol processing unit 22b notifies the application processing unit 22a of connection set information. In this preferred embodiment, the IP address and the port number of the opposed communications apparatus 21, which makes the connection request, are used as the connection set information. Accordingly, the protocol processing unit 22b obtains, for example, the IP address and the port number of the communications apparatus at the transmission source, which are included in the transmission data, and notifies the application processing unit 22a of the obtained address and number.

(4) After notifying the application processing unit 22a of the connection set information, the protocol processing unit 22b transmits a connection response to the opposed communications apparatus 21, being the transmitter, and establishes a connection.

(5) Upon acceptance of the notification of the connection set information from the protocol processing unit 22b, the application processing unit 22b stores the connection set information in the protocol management table 22f. The protocol management table 22f is comprised, for example, by a storing unit (for instance, a volatile memory such as a RAM, etc. or a nonvolatile memory such as a hard disk, etc.) possessed by the communications apparatus 22.

(6) When the connection is established, the protocol processing unit 21b partitions the transmission data received from the application processing unit 21a into a predetermined size, and starts to sequentially transmit the partitioned data to the communications apparatus 22.

(7) In the meantime, in the communications apparatus 22, the protocol processing unit 22b transmits a data reception response to the opposed communications apparatus 21 each time the transmission data is received.

(8) When the reception of the communication data is complete, the protocol processing unit 22b restores the transmission data partitioned in (6), and transmits the restored data to the application processing unit 22a.

By repeating the above described processes in (6) through (8), the transmission process for the data from the opposed communications apparatus 21 to the communications apparatus 22 is performed.

(9) When the application processing unit 22a receives the transmission data from the protocol processing unit 22b, the threshold value managing unit 22b calculates a load imposed at the time of data reception, namely, a data amount (size) received per unit time. Then, the threshold value managing unit 22b makes a comparison between the calculated load and a predetermined threshold value.

(10) In this preferred embodiment, a control threshold value and a release threshold value are used. The normal data communication processes shown in (6) through (8) are performed unless the data amount received per unit time exceeds the control threshold value. Or, if the data amount received per unit time falls below the release threshold value, the threshold value managing unit 22d suspends the operations of the retransmission protocol controlling unit 22e, so that the normal data communication processes in (6) through (8) are performed.

The control threshold value and the release threshold value are determined by assessing the throughput based on a CPU which makes the application processing unit 22a run, and a memory capacity.

(11) If the data amount received per unit time exceeds the control threshold value, the threshold value managing unit 22d determines that the load imposed on the application processing unit 22a is too heavy, and makes the retransmission protocol controlling unit 22e run (this state is referred to as "control mode" hereinafter). Then, the threshold value managing unit 22d issues a retransmission control request for the protocol processing unit 22b to switch to the control mode.

A data communication process performed in a case where the opposed communications apparatus 21 transmits data α and β to the communications apparatus 22, which is in the control mode, is described below.

(12) The protocol processing unit 21b, which accepts the data α from the application processing unit 21a, transmits the data α to the communications apparatus 22.

(13) The protocol processing unit 22b, which receives the data α, transmits the received data α to the application processing unit 22a.

(14) Upon receipt of the data α from the protocol processing unit 22b, the application processing unit 22a issues to the protocol processing unit 22b a reception response instruction to transmit a reception response to the data α to the opposed communications apparatus 21, which is the transmission source.

(15) Upon receipt of the reception response instruction from the application processing unit 22a, the protocol processing unit 22b transmits a reception response to the data α to the opposed communications apparatus 21, which is the transmission source.

(16) Similarly, the protocol processing unit 21b, which accepts the data β from the application processing unit 21a, transmits the data β to the communications apparatus 22.

(17) At this time, for example, if a collision of data, etc. occurs on the communications network 23, the data β transmitted from the opposed communications apparatus 21 disappears, and is not transmitted to the communications apparatus 22.

(18) In the meantime, the protocol processing unit 21b transmits the data β and activates a retransmission timer to monitor the reception response to the data β. Upon detection of a timeout, the protocol processing unit 21b retransmits the data β.

(19) The protocol processing unit 22b, which receives the data β, transmits the received data β to the application processing unit 22a.

(20) At this time, for example, if the data amount received per unit time is equal to or larger than the throughput of the application processing unit 22a, the data β is destroyed for a reason such that an area for storing the data β cannot be secured in a memory. The protocol processing unit 22b, which is in the control mode, does not transmit the reception response to the data β to the opposed communications apparatus 21, which is the transmission source, unless a reception response instruction from the application processing unit 22a is received.

(21) The protocol processing unit 21b transmits the data β, and activates the retransmission timer to monitor the reception response to the data β. Upon detection of a timeout, the protocol processing unit 21b retransmits the data β.

(22) The protocol processing unit 22b, which receives the data β, transmits the received data β to the application processing unit 22a.

(23) Upon receipt of the data β from the protocol processing unit 22b, the application processing unit 22a issues to the protocol processing unit 22b a reception response instruction to transmit the reception response to the data β to the opposed communications apparatus 21 at the transmission source. Then, the protocol processing unit 22b transmits the reception response to the data β to the opposed communications apparatus 21 at the transmission source.

As described above, the threshold value managing unit 22d beforehand detects, for example, a situation where the throughput of the application processing unit 22a can be possibly inferior to that of the protocol processing unit 22b and switches to the control mode, and the retransmission protocol controlling unit 22e controls the protocol processing unit 22b, whereby the data β can be surely transmitted from the communication opposed apparatus 21 to the communications apparatus 22 even if the data β disappears as shown in (20).

Figure 6:
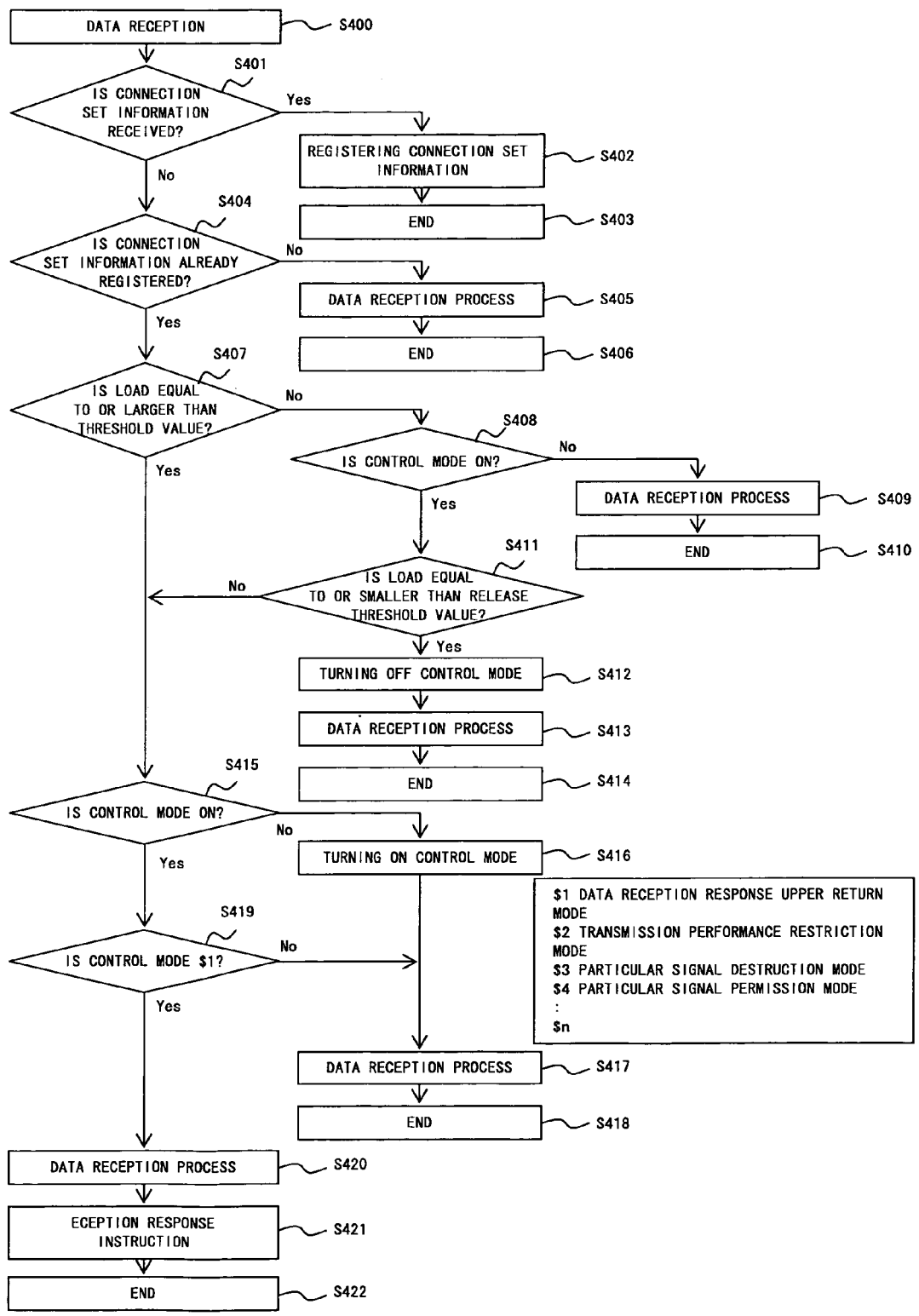
FIG. 6 is a flowchart showing a process performed by an application processing unit in the communications apparatus according to the preferred embodiment of the present invention.

FIG. 6 is a flowchart showing a process performed by the application processing unit 22a in the communications apparatus 22 according to the preferred embodiment of the present invention.

In step S400, the application processing unit 22a transfers the process to step S401 upon receipt of data from the protocol processing unit 22b.

In step S401, the application processing unit 22a checks whether or not the reception data is connection set information. If the reception data is the connection set information, the application processing unit 22a transfers the process to step S402. Then, the application processing unit 22a registers the connection set information to the protocol management table 22f. Upon completion of the registration, the application processing unit 22a transfers the process to step S403 to terminate the process.

Or, if the reception data is not the connection set information in step S401, the application processing unit 22a transfers the process to step S404.

In step S404, the application processing unit 22a references the protocol management table 22f. Then, the application processing unit 22a checks whether or not the connection set information is registered to the protocol management table 22f. If the connection set information is not registered to the protocol management table 22f, the application processing unit 22a transfers the process to step S405 to perform a data reception process. Then, the application processing unit 22a transfers the process to step S406 to terminate the process.

In the meantime, if the connection set information is already registered to the protocol management table 22f in step S404, the application processing unit 22a transfers the process to step S407.

In step S407, the application processing unit 22a calculates a load imposed at the time of data reception, and compares with a control threshold value. If the load is equal to or larger than the control threshold value, the application processing unit 22a transfers the process to step S408.

In step S408, the application processing unit 22a obtains the current state of control mode. For example, a flag for holding ON/OFF of the control mode is provided in a predetermined area in a memory, and this flag is referenced, thereby obtaining the current state of the control mode.

If the control mode is OFF, the application processing unit 22a transfers the process to step S409 to perform a data reception process. Then, the application processing unit 22a transfers the process to step S410 to terminate the process. If the control mode is ON, the application processing unit 22a transfers the process to step S411.

In step S411, the application processing unit 22a makes a comparison between the load calculated in step S407 and the release threshold value. If the load is equal to or smaller than the release threshold value, the application processing unit 22a transfers the process to step S412.

In step S412, the application processing unit 22a sets the control mode to OFF, and transfers the process to step S413. In step S413, the application processing unit 22a performs a data reception process. Then, the application processing unit 22a transfers the process to step S414 to terminate the process.

If the load is equal to or larger than the control threshold value in step S407, or if the load is not equal to or smaller than the release threshold value in step S411, the application processing unit 22a transfers the process to step S415.

In step S415, the application processing unit 22a obtains the current state of the control mode. For example, in a similar manner as in step S408, a flag for holding ON/OFF of the control mode is provided in a predetermined area within a memory, and this flag is referenced, thereby obtaining the current state of the control mode.

If the control mode is not ON, the application processing unit 22a transfers the process to step S416. Then, the application processing unit 22a sets predetermined control mode (any of $1, $2, $3, $4 . . . ) to ON.

In this preferred embodiment, the control mode is notified to the protocol processing unit 22b with the retransmission control request shown in FIG. 5.

FIG. 5 shows the case of the $1 data reception response upper return mode is shown as an example of the control mode. However, $2 transmission performance restriction mode, $3 particular signal destruction mode, $4 particular signal permission mode, etc. may be used as the control mode. The control modes $1 to $4 will be described later with reference to FIGS. 8 through 11.

After setting the control mode to ON, the application processing unit 22a transfers the process to step S417 to perform a data reception process. Then, the application processing unit 22a transfers the process to step S418 to terminate the process.

In the meantime, if the control mode is ON in step S415, the application processing unit 22a transfers the process to step S419. If the control mode is not the $1 data reception response upper return mode, the application processing unit 22a transfers the process to step S417. Or, if the control mode is the $1 data reception response upper return mode, the application processing unit 22a transfers the process to step S420.

In step S420, the application processing unit 22a performs a data reception process. Upon completion of the reception process, the application processing unit 22a transfers the process to step S421.

In step S421, the application processing unit 22a issues a reception response instruction to the protocol processing unit 22b. Then, the application processing unit 22a transfers the process to step S422 to terminate the process.

FIG. 7 is a flowchart showing a process performed by the protocol processing unit 22b in the communications apparatus 22 according to the preferred embodiment of the present invention.

In step S500, the protocol processing unit 22b transfers the process to step S501 upon receipt of data from the opposed communications apparatus.

In step S501, the protocol processing unit 22b checks whether or not the reception data is a connection request. If the reception data is the connection request, the protocol processing unit 22b transfers the process to step S502.

In step S502, the protocol processing unit 22b obtains connection set information included in the reception data, and notifies the application processing unit 22a of the obtained information. In step S503, the protocol processing unit 22b transmits a connection response to the transmission source of the reception data, and establishes a connection. Then, the protocol processing unit 22b transfers the process to step S504 to terminate the process.

Or, if the reception data is not the connection request in step S501, the protocol processing unit 22b transfers the process to step S505.

In step S505, the protocol processing unit 22b obtains the current (state of the?) control mode. If the control mode is OFF, the protocol processing unit 22b transfers the process to step S506.

In step S506, the protocol processing unit 22b transmits a data reception response to the transmission source of the reception data. In step S507, the protocol processing unit 22b completes the protocol process, and transmits the reception data to the application processing unit 22a. Then, the protocol processing unit 22b transfers the process to step S508 to terminate the process.

In the meantime, if the control mode is ON in step S505, the protocol processing unit 22b transfers the process to step S509. Then, the protocol processing unit 22b obtains the control mode ($1, $2, $3, $4 . . . ) set to ON in step S416 of FIG. 6.

In this preferred embodiment, the control mode is notified from the application processing unit 22a to the protocol processing unit 22b with the retransmission control request. The protocol processing unit 22b holds the control mode, for example, by using the flag secured in a storage area. Accordingly, the protocol processing unit 22b may obtain the control mode set to ON by referencing this flag.

After obtaining the control mode, the protocol processing unit 22b transfers the process to any of steps S5103, S5104, . . . , S510n according to the control mode, and performs a corresponding process of the $1 data reception response upper return mode, the $2 transmission performance restriction mode, the $3 particular signal destruction mode, the $4 particular signal permission mode etc. The control modes $1 to $4 will be described later with reference to FIGS. 8 through 11.

Upon completion of the process in any of the control modes, the protocol processing unit 22b transfers the process to step S511 to terminate the process.

FIG. 8 is a flowchart showing a process performed by the protocol processing unit 22b in the data reception response upper return mode according to the preferred embodiment of the present invention.

When the process is transferred to step S5101 shown in FIG. 7, the protocol processing unit 22b starts the operations of the data reception response upper return mode (step S600).

In step S601, the protocol processing unit 22b suspends a reception response to the received data. As shown in (for example, the process of (7) in) FIG. 5, the protocol processing unit 22b, which is not in the control mode, returns a data reception response upon normal receipt of data. However, in the data reception response upper return mode, the protocol processing unit 22b suspends this operation (returns a data reception response only when a reception response instruction is received from the application processing unit 22a).

In step S602, the protocol processing unit 22b transmits the data to the application processing unit 22a after processing the data under a predetermined protocol. Then, the protocol processing unit 22b transfers the process to step S603 to terminate the process.

As described above, the protocol processing unit 22b, which is in the data reception response upper return mode, does not return a reception response even if data is received from the opposed communications apparatus. The protocol processing unit 22b returns a reception response when receiving the reception response instruction from the application processing unit 22a.

If the application processing unit 22a does not normally receive the data (for example, (20) shown in FIG. 5), the application processing unit 22a does not issue the reception response instruction to the protocol processing unit 22b. Therefore, the protocol processing unit 22b does not return the reception response to the opposed communications apparatus. Since the opposed communications apparatus cannot receive the reception response, it detects a timeout and retransmits the corresponding data.

Accordingly, even if reception data disappears between the protocol processing unit 22b and the application processing unit 22a, degradation in data quality, which is caused by the missing of reception data, can be prevented.

Figure 9:
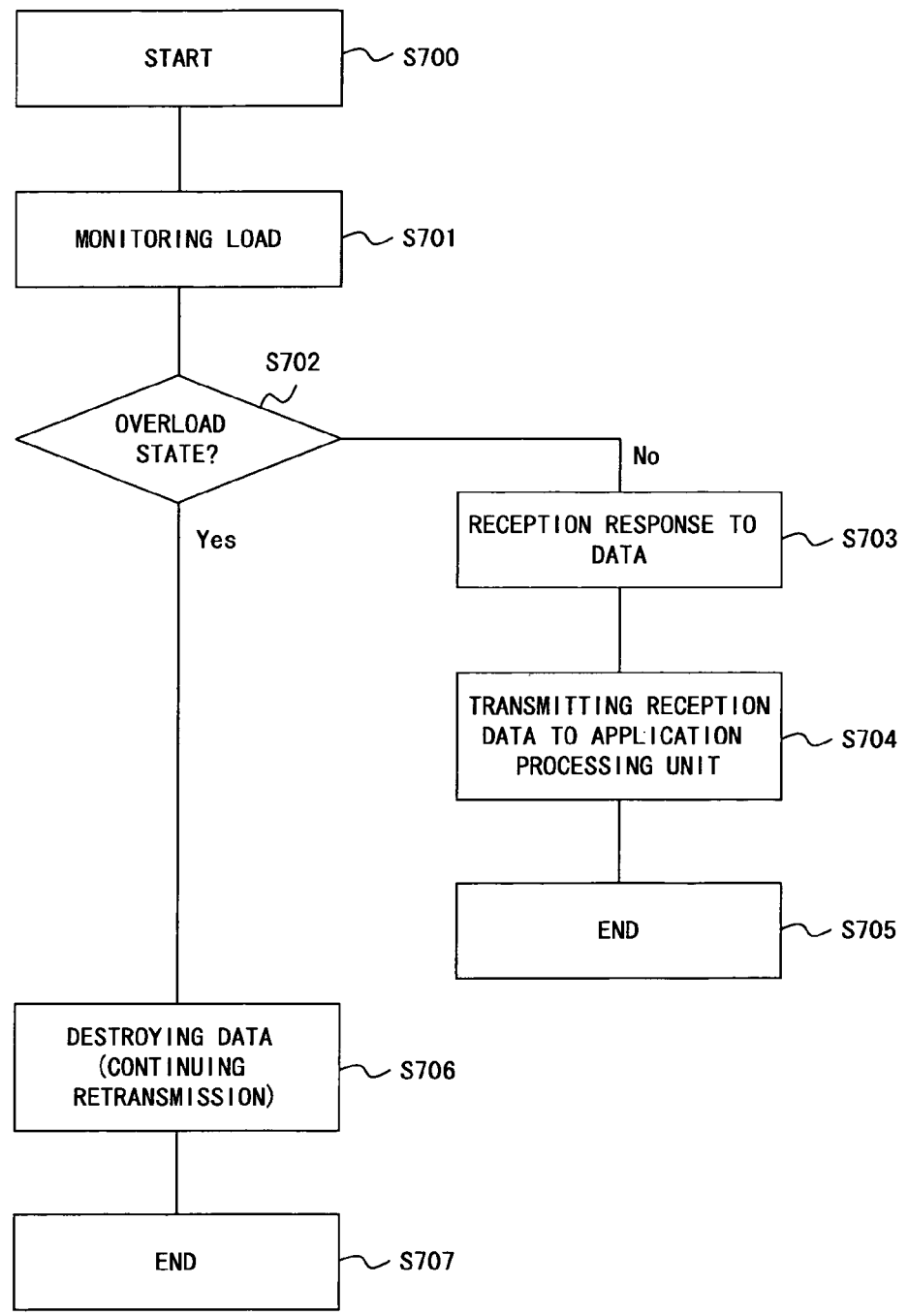
FIG. 9 is a flowchart showing a process performed by the protocol processing unit in transmission performance restriction mode according to the preferred embodiment of the present invention.

FIG. 9 is a flowchart showing a process performed by the protocol processing unit 22b in the transmission performance restriction mode according to the preferred embodiment of the present invention.

When the process is transferred to step S5102 shown in FIG. 7, the protocol processing unit 22b starts the operations of the transmission performance restriction mode (step S700).

In step S701, the protocol processing unit 22b monitors a load imposed at the time of a reception data process in the application processing unit 22a. In this preferred embodiment, a data amount (data size) received per unit time is calculated and used as the load.

In step S702, the protocol processing unit 22b makes a comparison between the load calculated in step S701 and a predetermined reference value. If the load is equal to or smaller than the reference value, the protocol processing unit 22b determines that the application processing unit 22a is not in an overload state, and transfers the process to step S703.

In step S703, the protocol processing unit 22b returns a data reception response to the reception data. Then, the protocol processing unit 22b transfers the process to step S704 to process the reception data under a predetermined protocol, and transmits the processed reception data to the application processing unit 22a. Then, the protocol processing unit 22b transfers the process to step S705 to terminate the process.

In the meantime, if the load exceeds the reference value in step S702, the protocol processing unit 22b determines that the application processing unit 22a is in the overload state, and transfers the process to step S706.

In step S706, the protocol processing unit 22b destroys the reception data. Then, the protocol processing unit 22b transfers the process to step S707 to terminate the process.

In the overload state, the protocol processing unit 22a destroys the reception data and does not return the reception response. Therefore, the transmission source detects a timeout and retransmits the same data. Namely, the transmission source continues a retransmission process until the overload state is resolved.

As described above, the protocol processing unit 22b, which is in the transmission performance restriction mode, destroys reception data without transmitting the data to the application processing unit 22a, if the load imposed at the time of the reception data process in the application processing unit 22a exceeds the predetermined load (the case of a possible overload state). In the meantime, since the opposed communications apparatus cannot receive the reception response, the apparatus detects a timeout and retransmits the destroyed data.

Accordingly, data can be prevented from being destroyed, by way of example, for a reason such that the throughput of the application processing unit 22a is inferior to that of the protocol processing unit 22b and a memory for storing data cannot be secured. Namely, reception data can be prevented from missing between the protocol processing unit 22b and the application processing unit 22a. As a result, data can be surely received with the retransmission capability, and degradation in data quality, which is caused by the missing of reception data, can be prevented.

Figure 10:
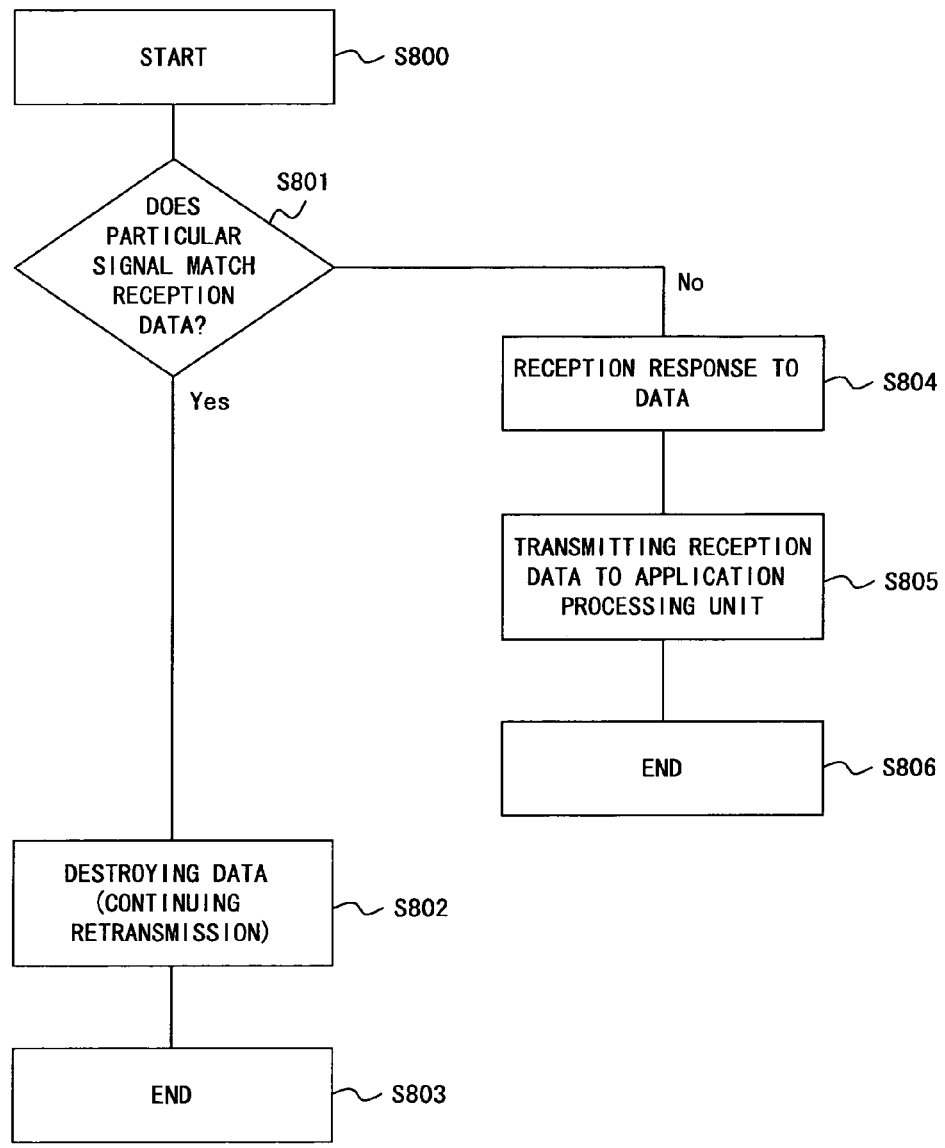
FIG. 10 is a flowchart showing a process performed by the protocol processing unit in particular signal destruction mode according to the preferred embodiment of the present invention.

FIG. 10 is a flowchart showing a process performed by the protocol processing unit 22b in the particular signal destruction mode according to the preferred embodiment of the present invention.

When the process is transferred to step S5103 shown in FIG. 7, the protocol processing unit 22b starts the operations of the particular signal destruction mode (step S800).

In step S801, the protocol processing unit 22b makes a comparison between one or more preset signals (hereinafter referred to as a destruction signal group) and a signal for reception data (hereinafter referred to as a reception signal), and determines whether or not a signal that matches the reception signal exists.

If the signal that matches the reception signal exists in the destruction signal group, the protocol processing unit 22b transfers the process to step S802 to destroy the reception data. Then, the protocol processing unit 22b transfers the process to step S803 to terminate the process.

Or, if the signal that matches the reception signal does not exist in the destruction signal group, the protocol processing unit 22b transfers the process to step S804.

In step S804, the protocol processing unit 22b returns a data reception response to the reception data. Then, the protocol processing unit 22b transfers the process to step S805 to process the reception data under a predetermined protocol, and transmits the processed reception data to the application processing unit 22a. Then, the protocol processing unit 22b transfers the process to step S806 to terminate the process.

As described above, the protocol processing unit 22b, which is in the particular signal destruction mode, destroys data for a particular signal, thereby reducing the load of the data reception process in the application processing unit 22a. As a result, data can be prevented from being destroyed, by way of example, for a reason such that the throughput of the application processing unit 22a is inferior to that of the protocol processing unit 22b and a memory for storing the data cannot be secured (reception data can be prevented from missing between the protocol processing unit 22b and the application processing unit 22a).

Consequently, data can be surely received with the retransmission capability, and degradation in data quality, which is caused by the missing of reception data, can be prevented.

FIG. 11 is a flowchart showing a process performed by the protocol processing unit 22b in the particular signal permission mode according to the preferred embodiment of the present invention.

When the process is transferred to step S5104 shown in FIG. 7, the protocol processing unit 22b starts the operations of the particular signal permission mode (step S900).

In step S901, the protocol processing unit 22b makes a comparison between one or more preset signals (hereinafter referred to as a permission signal group) and a reception signal, and determines whether or not a signal that matches the reception signal exists.

If the signal that matches the reception signal exists in the permission signal group, the protocol processing unit 22b transfers the process to step S902.

In step S902, the protocol processing unit 22b returns a data reception response to the reception data. Then, the protocol processing unit 22b transfers the process to step S903, in which the protocol processing unit 22b processes the reception data under a predetermined protocol, and transmits the processed reception data to the application processing unit 22a. Then, the protocol processing unit 22b transfers the process to step S904 to terminate the process.

Or, if the signal that matches the reception signal does not exist in the permission signal group in step S901, the protocol processing unit 22b transfers the process to step S905 to destroy the reception data. Then, the protocol processing unit 22b transfers the process to step S906 to terminate the process.

As described above, the protocol processing unit 22b, which is in the particular signal permission mode, destroys data other than data with a particular signal, whereby the load of the data reception process in the application processing unit 22a is reduced. As a result, data can be prevented from being destroyed, by way of example, for a reason such that the throughput of the application processing unit 22a is inferior to that of the protocol processing unit 22b and a memory for storing the data cannot be secured (reception data can be prevented from missing between the protocol processing unit 22b and the application processing unit 22a).

Consequently, data can be surely received with the retransmission capability, and degradation in data quality, which is caused by the missing of reception data, can be prevented.

With the processes performed in the control modes, which are shown in FIGS. 9 through 11, a reliable data communication can be made without newly providing a retransmission control capability in the application processing unit 22a.

Additionally, the communications apparatus 22 according to the present invention selectively uses the plurality of control modes ($1, $2, $3, $4, etc.), whereby an optimum retransmission control can be performed to maintain the reliability.

In the system for maintaining data quality with the retransmission process using TCP, etc., a control is performed for the retransmission processing unit (protocol processing unit) when the data processing unit (application processing unit) for processing data, the quality of which is assured with the retransmission process, performs a data process requiring a throughput higher than that of the data processing unit, whereby the final quality in the data processing unit can be secured.

Here, the above described communications apparatus 22 is not limited to the configuration shown in FIG. 4. Modification examples of the communications apparatus 22 are shown in FIGS. 12 and 13.

Figure 12:
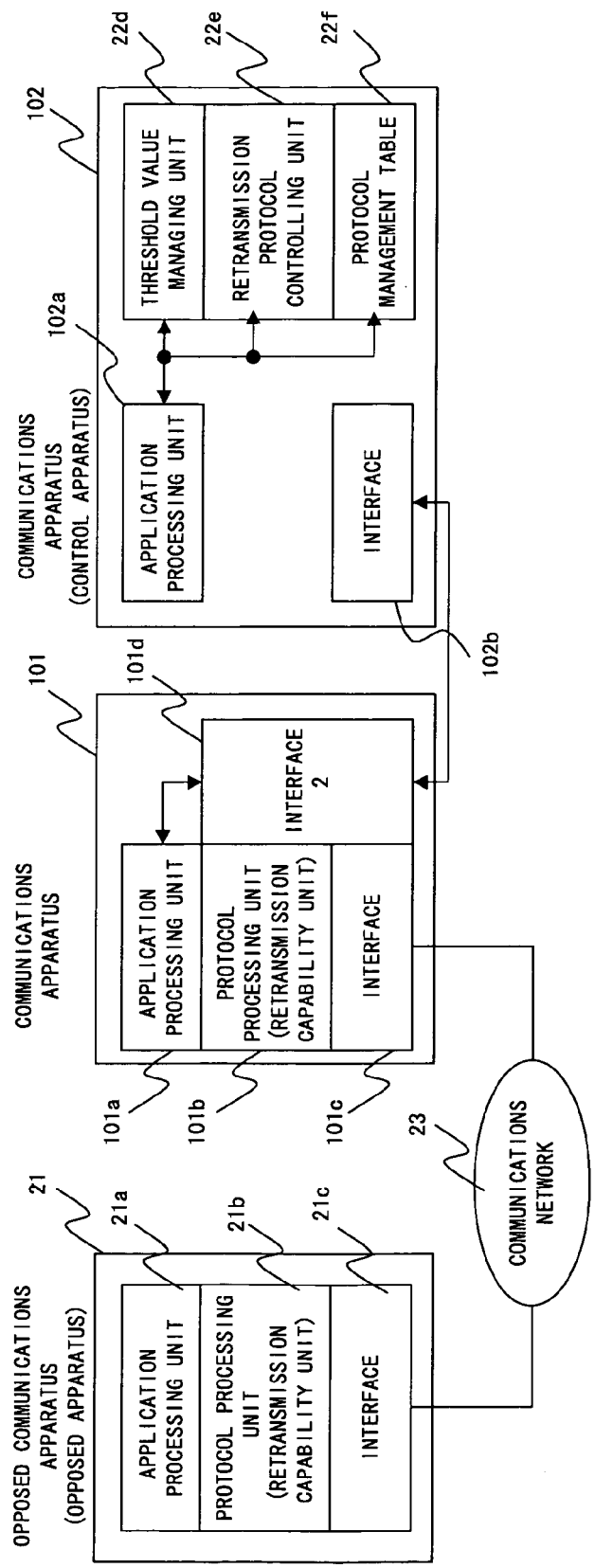
FIG. 12 is a block diagram exemplifying a modification of the configuration of the communications apparatus according to the preferred embodiment of the present invention.
Figure 13:
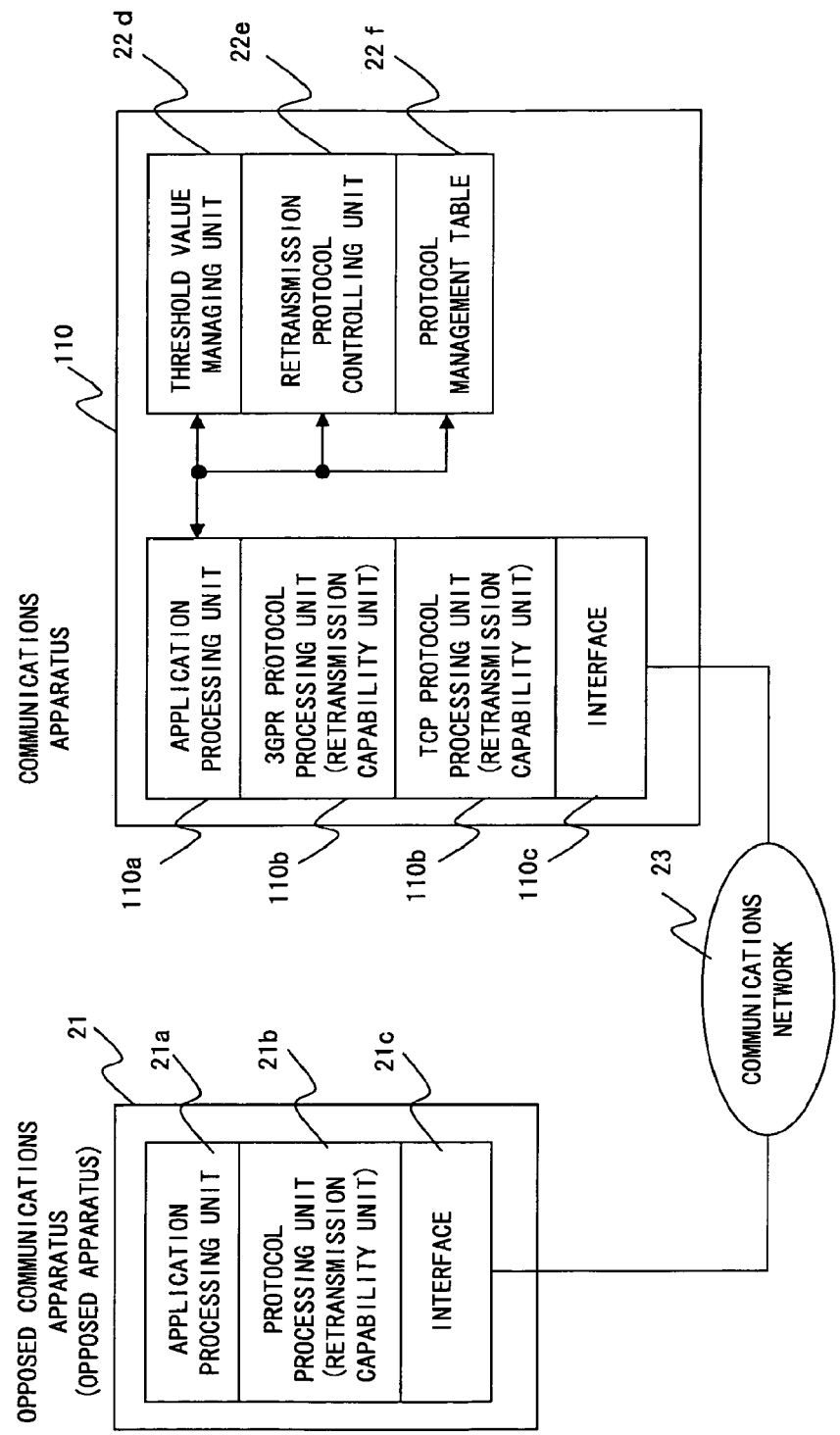
FIG. 13 is a block diagram exemplifying a modification of the configuration of the communications apparatus according to the preferred embodiment of the present invention.

The communications apparatus 100 shown in FIG. 12 is an apparatus comprising communications apparatuses 101 and 102, which are interconnected to be communicable.

The communications apparatus 101 comprises an application processing unit 101a for making a data communication, a protocol processing unit 101b for enabling a communication between arbitrary computers and for assuring transmission data, an interface 101c for converting an electric signal on a network into electronic data and for enabling a data transmission between the computers, and a communications interface 101d with the communications apparatus 102.

The communications apparatus 102 comprises an application processing unit 102a for making a data communication, and a communications interface 102b with the communications apparatus 101. The application processing unit 102a comprises the threshold value managing unit 22d, the retransmission protocol controlling unit 22e, and the protocol management table 22f, which are shown in FIG. 4.

When the communications apparatus 102 makes a communication with the opposed communications apparatus 21, the application processing unit 102a transmits data to the protocol processing unit 101b via the interfaces 102b and 101d. After processing the data under a predetermined protocol, the protocol processing unit 101b transmits the processed data to the opposed communications apparatus 21 via the interface 101c and the communications network 23.

Additionally, upon receipt of data from the opposed communications apparatus 21, the protocol processing unit 101b transmits the data to the application processing unit 102a via the interfaces 101d and 102b after processing the data under a predetermined protocol.

Accordingly, also the data communication with the configuration (the application processing units 21a and 102a shown in FIG. 12 is made according to the processes shown in FIGS. 5 through 11.

A communications apparatus 110 shown in FIG. 13 comprises an application processing unit 110a for making a data communication, protocol processing units 110b for enabling a communication between arbitrary computers and for assuring transmission data, and an interface 110c for converting en electric signal on a network into electronic data and for enabling a data transmission between the computers. The application processing unit 11a comprises the threshold value managing unit 22d, the retransmission protocol controlling unit 22e, and the protocol management table 22f, which are shown in FIG. 4.

Note that the communications apparatus 110 shown in FIG. 13 comprises two protocol processing units 101b.

When the communications apparatus 110 makes a communication with the opposed communications apparatus 21, the application processing unit 110a transmits data to either of the protocol processing units 110b. The protocol processing unit 110b, which receives the data, transmits the data to the opposed communications apparatus 21 via the interface 110c and the communications network 23 after processing the data under a predetermined protocol.

In the meantime, the protocol processing unit 10b, which receives data from the opposed communications apparatus 21, transmits the data to the application processing unit 110a after processing the data under a predetermined protocol.

Accordingly, also a data communication of the configuration shown in FIG. 13 is made according to the processes shown in FIGS. 5 through 11.

What is claimed is:

1. A communications apparatus having an application processing unit for making a data communication with an opposed communications apparatus, and a protocol processing unit for transmitting/receiving data according to an instruction from the application processing unit and for retransmitting the data to the opposed communications apparatus if a reception response to the data transmitted to the opposed communications apparatus is not received during a predetermined duration, wherein:

the protocol processing unit comprises a first data notifying unit for transmitting a reception response to data upon receipt of the data from the opposed communications apparatus and for passing the data to the application processing unit, and a second data notifying unit for passing data to the application processing unit upon receipt of the data from the opposed communications apparatus and for transmitting a reception response to the data according to an instruction from the application processing unit; and the application processing unit comprises a load monitor processing unit for monitoring a load of a reception process based on the data passed from said first data notifying unit and for switching from said first data notifying unit to said second data notifying unit if the load exceeds a predetermined load, and a reception response processing unit for issuing to said second data notifying unit an instruction to transmit a reception response to passed data, when the data is passed from the second data notifying unit.

2. The communications apparatus according to claim 1, further comprising a connection set information notifying unit for obtaining connection set information, which is information about the opposed communications apparatus, from the opposed communications apparatus and for notifying the application processing unit of the obtained information, wherein said reception response processing unit determines a transmission destination of the reception response by referencing the connection set information and for issuing to said second data notifying unit an instruction to transmit the reception response to the transmission destination.

3. The communications apparatus according to claim 1, wherein
a data amount per unit time, which is passed from said first data notifying unit, is used as the load of the reception process.

4. A communications apparatus having an application processing unit for making a data communication with an opposed communications apparatus, and a protocol processing unit for transmitting/receiving data according to an instruction from the application processing unit and for assuring transmission data by retransmitting the data to the opposed communications apparatus if a reception response to the data transmitted to the opposed communications apparatus is not received during a predetermined duration, wherein:
the protocol processing unit comprises
a first data notifying unit for transmitting a reception response to data upon receipt of the data from the opposed communications apparatus and for passing the data to the application processing unit, and
a second data notifying unit for destroying data under a predetermined rule upon receipt of the data from the opposed communications apparatus; and
the application processing unit comprises
a load monitor processing unit for monitoring a load of a transmission/reception process based on the data passed from said first data notifying unit and for switching from said first data notifying unit to said second data notifying unit if the load exceeds a predetermined load.

5. The communications apparatus according to claim 4, wherein
a data amount per unit time, which is passed from said first data notifying unit, is used as the load of the reception process.

6. The communications apparatus according to claim 4, wherein
said second data notifying unit calculates a load of a transmission/reception process based on data upon receipt of the data from the opposed communications apparatus, passes the data to the application processing unit if the calculated load is equal to or smaller than a predetermined load, and destroys the data if the calculated load is larger than the predetermined load.

7. The communications apparatus according to claim 4, wherein
said second data notifying unit makes a comparison between data and predetermined data upon receipt of the data from the opposed communications apparatus, and destroys the data if the data matches the predetermined data as a result of the comparison, or passes the data to the application processing unit if the data does not match the predetermined data as a result of the comparison.

8. The communications apparatus according to claim 4, wherein
said second data notifying unit makes a comparison between data and predetermined data upon receipt of the data from the opposed communications apparatus, and passes the data to the application processing unit if the data matches the predetermined data as a result of the comparison, or destroys the data if the data does not match the predetermined data as a result of the comparison.

9. The communications apparatus according to claim 7, wherein
the comparison is made between part of the data and the predetermined data.

10. A data communications method implemented by an application processing unit for making a data communication with an opposed communications apparatus, and a protocol processing unit for transmitting/receiving data according to an instruction from the application processing unit and for assuring transmission data by retransmitting the data to the opposed communications apparatus if a reception response to the data transmitted to the opposed communications apparatus is not received during a predetermined duration, comprising:
causing the protocol processing unit to perform either a first data notification process for transmitting a reception response to data upon receipt of the data from the opposed communications apparatus and for passing the data to the application processing unit, or a second data notification process for passing data to the application processing unit upon receipt of the data from the opposed communications apparatus and for transmitting a reception response to the data according to an instruction from the application processing unit; and
causing the application processing unit to perform a load monitor process for monitoring a load of a transmission/reception process based on the data passed from the first data notification process and for switching from the first data notification process to the second data notification process if the load exceeds a predetermined load, and to perform a reception response process for causing the second notification process to be performed to transmit a reception response to passed data when the data is passed from the second data notification process.

11. The data communications method according to claim 10, further comprising
causing the protocol processing unit to further perform a connection set information notification process for obtaining connection set information, which is information about the opposed communications apparatus, from the opposed communications apparatus and for notifying the application processing unit of the obtained connection set information, wherein
the reception response process determines a transmission destination of the reception response by referencing the connection set information, and causes the second data notification process to be performed for the transmission destination.

12. The data communications method according to claim 10, wherein
a data amount per unit time, which is passed from the first data notification process, is used as the load of the reception process.

* * * * *